United States Patent
Bush et al.

(10) Patent No.: US 11,015,080 B2
(45) Date of Patent: May 25, 2021

(54) POWDER COATING COMPOSITIONS AND COATINGS FORMED THEREFROM

(71) Applicant: PPG Industries Ohio, Inc., Cleveland, OH (US)

(72) Inventors: Travis Owen Bush, Valley View, TX (US); Paul W. Bradley, Corinth, TX (US); Victor A. Monroy, Gainesville, TX (US); John C. Reising, Oberlin, OH (US); Lan Deng, Solon, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 99 days.

(21) Appl. No.: 16/541,850

(22) Filed: Aug. 15, 2019

(65) Prior Publication Data
US 2021/0047537 A1 Feb. 18, 2021

(51) Int. Cl.
*C09D 167/02* (2006.01)
*C09D 5/03* (2006.01)

(52) U.S. Cl.
CPC .......... *C09D 167/02* (2013.01); *C09D 5/035* (2013.01)

(58) Field of Classification Search
CPC .............. C09D 167/02; C09D 5/035
USPC ........................................... 524/513
See application file for complete search history.

(56) References Cited

U.S. PATENT DOCUMENTS

| 6,864,316 | B1 | 3/2005 | Iwakiri et al. |
| 8,853,320 | B2 * | 10/2014 | Wang ................... C09D 127/12 524/538 |
| 9,714,360 | B2 * | 7/2017 | Saito .................... C09D 175/04 |
| 2016/0096975 | A1 * | 4/2016 | Saito ....................... C09D 5/03 427/180 |

FOREIGN PATENT DOCUMENTS

| CN | 107254239 A | 10/2017 | |
| CN | 109735214 A | 5/2019 | |
| EP | 1233044 A1 * | 8/2002 | .......... C09D 167/02 |
| EP | 1233044 A1 | 8/2002 | |
| EP | 3088180 A1 | 11/2016 | |
| WO | 2013186832 A1 | 12/2013 | |
| WO | 2018/194067 A1 | 10/2018 | |

* cited by examiner

*Primary Examiner* — Michael Bernshteyn
(74) *Attorney, Agent, or Firm* — Michael J. Grese

(57) ABSTRACT

A powder coating composition can include: a polyester polymer comprising carboxylic acid functional groups; a crosslinker reactive with the carboxylic acid functional groups of the polyester polymer; and a thermoplastic fluoropolymer unreactive with the polyester polymer and crosslinker. The powder coating composition is substantially free of an isocyanate functional crosslinker.

21 Claims, No Drawings ies, decorative properties, and the like. For instance, fluoropolymer based powder coating compositions are commonly applied to substrates, such as metal substrates, to provide good weather resistance. While fluoropolymer based powder coating compositions provide good weather resistance, these compositions typically require large amounts of the fluoropolymer component. As a result, these compositions are typically expensive due to the high cost of fluoropolymer raw materials. As such, it is desirable to provide fluoropolymer based powder coating compositions that utilize other components to reduce the amount of fluoropolymer and which still provide good physical properties such as good weather and corrosion resistance.

POWDER COATING COMPOSITIONS AND COATINGS FORMED THEREFROM

FIELD OF THE INVENTION

The present invention relates to powder coating compositions containing polyester polymers and fluoropolymers, coatings formed from the powder coating compositions, and substrates at least partially coated with such coatings.

BACKGROUND OF THE INVENTION

Powder coating compositions are applied to substrates to provide numerous properties including protective properties, decorative properties, and the like. For instance, fluoropolymer based powder coating compositions are commonly applied to substrates, such as metal substrates, to provide good weather resistance. While fluoropolymer based powder coating compositions provide good weather resistance, these compositions typically require large amounts of the fluoropolymer component. As a result, these compositions are typically expensive due to the high cost of fluoropolymer raw materials. As such, it is desirable to provide fluoropolymer based powder coating compositions that utilize other components to reduce the amount of fluoropolymer and which still provide good physical properties such as good weather and corrosion resistance.

SUMMARY OF THE INVENTION

The present invention is directed to a powder coating composition that includes: a polyester polymer comprising carboxylic acid functional groups and having an acid value of at least 15 mg KOH/g; a crosslinker reactive with the carboxylic acid functional groups of the polyester polymer; and a thermoplastic fluoropolymer unreactive with the polyester polymer and crosslinker. The powder coating composition is substantially free of an isocyanate functional crosslinker.

The present invention also includes substrates at least partially coated with a coating formed from the powder coating compositions described herein. The coatings formed from the powder coating compositions of the present invention can provide good weatherability and corrosion resistance, and a broad range of gloss.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" fluoropolymer, "a" polyester polymer, "a" crosslinker, and the like refer to one or more of any of these items.

As indicated, the present invention is directed to a powder coating composition that includes a polyester polymer having carboxylic acid functional groups, a crosslinker reactive with the carboxylic acid functional groups of the polyester polymer, and a thermoplastic fluoropolymer unreactive with the polyester polymer and crosslinker.

As used herein, a "powder coating composition" refers to a coating composition embodied in solid particulate form as opposed to liquid form. Thus, the components that form the powder coating composition can be combined to form a curable solid particulate powder coating composition. For instance, the polyester polymer, fluoropolymer, crosslinker, and optional additional components can be combined to form a curable solid particulate powder coating composition that is free flowing. As used herein, the term "free flowing" with regard to curable solid particulate powder coating compositions of the present invention, refers to a curable solid particulate powder composition having a minimum of clumping or aggregation between individual particles. The spraying suitability factor R of a powder coating may be measured with a Sames AS 100 Fluidity Indicator according to Test method ISO/DIS 8130-05 or the AS 100 Fluidity User Manual. The powder coating composition of the present invention may have a spraying suitability factor R of greater than 140 (Very Good rating), or greater than 120 (Good rating).

As indicated, the powder coating composition of the present invention comprises a polyester polymer. As used herein, a "polyester polymer" refers to a polymer that includes one or more ester functional groups to link monomer units. As used herein, the term "polymer" refers to oligomers and homopolymers (e.g., prepared from a single monomer species), copolymers (e.g., prepared from at least two monomer species), and graft polymers. The term "resin" is used interchangeably with "polymer."

Non-limiting examples of suitable polyester polymers that can be used in the powder coating compositions of the present invention include polyester polymers based on a condensation reaction of aliphatic polyols, including cycloaliphatic polyols, with aliphatic and/or aromatic polycarboxylic acids and anhydrides. The term "aliphatic" refers to non-aromatic straight, branched, or cyclic hydrocarbon structures that contain saturated carbon bonds. The saturated carbon chain or chains of the aliphatic structures can also comprise and be interrupted by other elements including, but not limited to, oxygen, nitrogen, carbonyl groups, and combinations thereof. Thus, the saturated carbon chain of the aliphatic structures can comprise, but is not limited to, ether groups, ester groups, and combinations thereof. Further, the term "aromatic" refers to a cyclically conjugated hydrocarbon with a stability (due to electron delocalization) that is significantly greater than that of a hypothetical localized structure.

As used herein, a "polyol" refers to a compound comprising two or more hydroxyl groups. Aliphatic polyols that can be used to prepare polyester polymers useful in the powder coating compositions of the present invention can for example comprise from 2 to 12 carbon atoms. Non-limiting examples of suitable aliphatic polyols include 1,2-ethanediol, 1,3-propanediol, 1,4-butanediol, 1,6-hexanediol, neopentyl glycol, cyclohexane dimethanol, trimethylol propane, and the like.

A "polycarboxylic acid" refers to an organic compound with two or more carboxylic acid groups, or an anhydride of the acid. The polycarboxylic acid or anhydride may be an aromatic and/or cyclic polycarboxylic acid or anhydride thereof. As used herein, a "cyclic polycarboxylic acid" refers to a component comprising at least one closed ring structure, such as a carbocycle, for example an aromatic ring structure, with two or more carboxylic acid groups or the anhydride of the acid. The cyclic polycarboxylic acid, typically a cyclic diacid, can include aromatic cyclic polycarboxylic acids, aliphatic cyclic polycarboxylic acids, and combinations thereof. Non-limiting examples of aromatic cyclic polycarboxylic acids, or the anhydride thereof, include terephthalic acid, isophthalic acid, orthophthalic acid, phthalic anhydride, trimellitic acid, trimellitic anhydride, and combinations thereof. Non-limiting examples of aliphatic non-aromatic cyclic polycarboxylic acids, or the anhydride thereof, include 1,4-cyclohexanedicarboxylic acid, 1,3-cyclohexanedicarboxylic acid, decahydronaphthalene dicarboxylic acid, 1,3-cyclopentanedicarboxylic acid, 1,1-cyclopropanedicarboxylic acid, tetrahydrophthalic acid, hexahydrophthalic acid, hexahydrophthalic anhydride, and combinations thereof. Other suitable polycarboxylic acids and anhydrides include linear aliphatic polycarboxylic acids such as succinic acid, adipic acid, azelaic acid, sebacic acid, and anhydrides of such acids. The polyol and the polycarboxylic acid may be reacted with a molar excess of the polycarboxylic acid over polyol so as to form a polyester with carboxylic acid functionality. Suitable polyester polymers are also commercially available from Arkema under the trade name REAFREE® and from Royal DSM under the trade name URALAC®.

The polyester polymer used with the powder coating composition is a thermoset polymer. By "thermoset polymer" it is meant a polymer having functional groups that are reactive with themselves and/or a crosslinking agent, and upon such reaction (referred to as curing), the polymer forms irreversible covalent bonds. Once cured or crosslinked, a thermoset polymer will not melt upon the application of heat and is insoluble in solvents.

The terms "curable", "cure", and the like, as used in connection with a coating composition, means that at least a portion of the components that make up the coating composition are polymerizable and/or crosslinkable. The coating composition of the present invention can be cured at ambient conditions, with heat, or with other means such as actinic radiation. The term "actinic radiation" refers to electromagnetic radiation that can initiate chemical reactions. Actinic radiation includes, but is not limited to, visible light, ultraviolet (UV) light, X-ray, and gamma radiation.

Further, "ambient conditions" refers to the conditions of the surrounding environment (e.g., the temperature, humidity, and pressure of the room or outdoor environment in which the substrate is located such as, for example, at a temperature of 23° C. and at a relative humidity in the air of 35% to 75%).

The polyester polymers used with the powder coating composition of the present invention comprise carboxylic acid functional groups that are reactive with the crosslinker, which is described in further detail herein. The polyester polymers used with the powder coating compositions of the present invention can also include additional functional groups such as, for example, epoxide groups, hydroxyl groups, amine groups, alkoxy groups, thiol groups, carbamate groups, amide groups, urea groups, and combinations thereof. The polyester polymers used with the present invention can also be free of any one of the previously described additional functional groups.

The polyester polymer used with the powder coating compositions of the present invention can comprise at least 1 weight %, at least 5 weight %, at least 10 weight %, at least 20 weight %, 30 weight %, at least 35 weight %, at least 40 weight %, at least 50 weight %, or at least 60 weight %, based on the total solids weight of the powder coating composition. The polyester polymers used with the coating compositions of the present invention can comprise up to 95 weight %, up to 90 weight %, up to 80 weight %, or up to 70 weight %, based on the total solids weight of the coating composition. The polyester polymers can also comprise a range such as from 1 to 95 weight %, from 5 to 95 weight %, from 10 to 90 weight %, from 20 to 80 weight %, from 30 to 80 weight %, from 40 to 80 weight %, or from 60 to 80 weight %, based on the total solids weight of the coating composition.

The polyester polymers can have an acid value of at least 10 mg KOH/g, at least 15 mg KOH/g, at least 20 mg KOH/g, or at least 30 mg KOH/g. The polyester can have an acid value of up to 70 mg KOH/g, up to 60 mg KOH/g, or up to 50 mg KOH/g. The polyester can have an acid value in the range such as from 10 to 70 mg KOH/g, from 20 to 70 mg KOH/g, or from 20 to 50 mg KOH/g. The acid number (AN) is expressed on solids.

The acid number (AN) of the polyester polymers may be measured by any suitable method. Methods to measure AN will be well known to a person skilled in the art. Suitably, the AN is determined by titration with 0.1M methanolic potassium hydroxide (KOH) solution. A sample of solid polyester (typically, 0.1 to 3 g) is weighed accurately into a conical flask and is dissolved, using light heating and stirring as appropriate, in 25 ml of dimethyl formamide containing phenolphthalein indicator. The solution is then cooled to room temperature and titrated with the 0.1M methanolic potassium hydroxide solution. The resulting acid number is expressed in units of mg KOH/g and is calculated using the following equation:

$$\text{Acid number} = \frac{\text{titre of KOH solution (ml)} \times \text{molarity KOH solution (M)} \times 56.1 \text{ g/mol}}{\text{weight of solid sample (g)}}$$

The polyester polymers used according to the present invention can have a glass transition temperature ("Tg") of at least 10° C., at least 25° C., or at least 45° C. The polyester polymers can have a Tg of up to 100° C., up to 85° C., or up to 70° C. The polyester polymers can have a Tg in a range such as from 10 to 100° C., from 25 to 85° C., or from 45 to 70° C. Glass transition temperature ("Tg"), as reported herein, was measured by differential scanning calorimetry according to ASTM D3418-15 unless otherwise indicated.

The polyester polymers can have a melt viscosity at 165° C. of at least 5 Pa·s, at least 7 Pa·s, or at least 9 Pa·s. The polyester polymers can have a melt viscosity at 165° C. of up to 100 Pa·s, up to 85 Pa·s, or up to 70 Pa·s. The polyester polymers can have a melt viscosity at 165° C. within a range such as from 5 to 100 Pa·s, from 7 to 85 Pa·s, or from 9 to 70 Pa·s. As used herein, the melt viscosity is measured by a Cone and Plate Viscometer made by Research Equipment (London) Ltd. Reference may be made to ASTM D 4287.

The polyester polymers can have a weight average molecular weight (Mw) of at least 1,000 g/mol, at least 3,000 g/mol, or at least 6,000 g/mol. The polyester polymers can have a Mw of up to 50,000 g/mol, up to 30,000 g/mol, up to 18,000 g/mol, or up to 10,000 g/mol. The polyester polymers can have a Mw within a range such as from 1,000 to 50,000 g/mol, from 3,000 to 30,000 g/mol, from 1,000 to 10,000 g/mol, or from 6,000 to 18,000 g/mol. As used herein, the Mw is measured by gel permeation chromatography using a polystyrene standard according to ASTM D6579-11 (performed using a Waters 2695 separation module with a Waters 2414 differential refractometer (RI detector); tetrahydrofuran (THF) was used as the eluent at a flow rate of 1 ml/min, and two PLgel Mixed-C (300×7.5 mm) columns were used for separation at the room temperature; weight and number average molecular weight of polymeric samples can be measured by gel permeation chromatography relative to linear polystyrene standards of 800 to 900,000 Da) unless otherwise indicated.

The powder coating composition of the present invention also includes a thermoplastic fluoropolymer. A "thermoplastic polymer" refers to a polymer that can be heated to become pliable or moldable and re-solidify upon cooling. It is appreciated that the fluoropolymer does not react with the polyester polymer, crosslinker, or any other optional component in the powder coating composition so that the fluoropolymer does not chemically bond with such components. As such, the fluoropolymer may be an inert component.

As used herein, a "fluoropolymer" refers to a polymer derived from one or more monomers with at least one of the monomers having at least one pendant fluorine sub stituent. For example, the fluoropolymer can include a polymer that has one or more monomeric repeat unit(s) selected from chlorotrifluoroethylene, tetrafluoroethylene, perfluoro (methyl vinyl ether), perfluoro(propyl vinyl ether), perfluoro (ethyl vinyl ether), vinylidene fluoride, hexafluoropropylene, and combinations thereof. The fluoropolymer can also include a polymer that has a monomeric repeat unit selected from tetrafluoroethylene oxide, hexafluoropropylene oxide, and combinations thereof.

Non-limiting examples of suitable fluoropolymers that can be used with the coating compositions of the present invention include a fluoropolyether, a perfluoropolyether, a chlorotrifluoroethylene polymer, a polyvinylidene fluoride polymer, a tetrafluoroethylene polymer, polyhexafluoropropylene, polytetrafluoroethylene, and copolymers and/or combinations thereof. Suitable fluoropolyether polymers include, but are not limited to, fluoroethylene vinyl ether copolymers. Suitable fluoropolymers are also commercially available from Asahi Glass Co. under the trade name LUMIFLON® and from Arkema under the trade name KYNAR®.

Further, as previously mentioned, the thermoplastic fluoropolymer is unreactive with the polyester polymer and crosslinker. As such, the fluoropolymer does not comprise functional groups that are reactive with and which can chemically bond to the functional groups of the polyester polymer, crosslinker, or other components in the powder coating composition. It is appreciated that the thermoplastic fluoropolymer may have reactive functional groups, provided that the reactive functional groups do not react and bond with the polyester polymer, crosslinker, or other optional components in the powder coating composition. Non-limiting examples of reactive functional groups include hydroxyl groups, thiol groups, (meth)acrylate groups, amine groups, carbamate groups, amide groups, urea groups, and combinations thereof. As used herein, the term "(meth)acrylate" refers to both the methacrylate and the acrylate. The thermoplastic fluoropolymer may also be free of any one of the previously described reactive functional groups.

The fluoropolymer used with the coating compositions of the present invention can comprise at least 1 weight %, at least 5 weight %, at least 10 weight %, at least 15 weight %, at least 20 weight %, 30 weight %, at least 40 weight %, at least 50 weight %, or at least 60 weight %, based on the total solids weight of the powder coating composition. The fluoropolymer used with the coating compositions of the present invention can comprise up to 95 weight %, up to 90 weight %, up to 80 weight %, up to 70 weight %, up to 60 weight %, up to 50 weight %, up to 40 weight %, up to 30 weight %, or up to 25 weight %, based on the total solids weight of the coating composition. The fluoropolymer can also comprise a range such as from 1 to 95 weight %, from 5 to 95 weight %, from 10 to 90 weight %, from 15 to 80 weight %, from 15 to 50 weight %, or from 20 to 40 weight %, based on the total solids weight of the coating composition.

The thermoplastic fluoropolymer can have a glass transition temperature (Tg) of at least 10° C., at least 25° C., or at least 34° C. The thermoplastic fluoropolymer can have a Tg of up to 100° C., up to 85° C., or up to 70° C. The thermoplastic fluoropolymer can have a Tg in a range such as from 10 to 100° C., from 25 to 85° C., or from 34 to 70° C.

The thermoplastic fluoropolymer can have a weight average molecular weight (Mw) of at least 1,000 g/mol, at least 5,000 g/mol, or at least 7,000 g/mol. The thermoplastic fluoropolymer can have a Mw of up to 75,000 g/mol, up to 50,000 g/mol, up to 40,000 g/mol. The thermoplastic fluoropolymer can have a Mw within a range such as from 1,000 to 75,000 g/mol, from 5,000 to 50,000 g/mol, or from 7,000 to 40,000 g/mol.

The amount of polyester polymer in the powder coating composition may be greater than the amount of thermoplastic fluoropolymer, based on the total resin solids weight of the powder coating composition. The powder coating composition may have a weight ratio of the polyester polymer to the thermoplastic fluoropolymer of from 94:6 to 20:80, such as from 85:15 to 35:65, from 80:20 to 60:40, from 80:20 to 55:45, or from 76:24 to 65:35.

It has been found that the powder coating composition of the present invention, when cured to form a coating, may form a single coating layer comprising the polyester polymer and the fluoropolymer. The thermoplastic polymer and the polyester polymer are dispersed throughout the single layer coating such that separate layers do not form, as observed by Scanning Electron Microscopy. The single coating layer comprising the polyester polymer and the fluoropolymer may include phase separation, provided that the phase comprising the fluoropolymer and the phase comprising the polyester polymer are distributed throughout the single layer. The single coating layer may be a nonhomogenous coating layer. The powder coating composition of the present invention may be applied to a substrate such that, when cured, both the polyester polymer and the thermoplastic fluoropolymer are in direct contact with the substrate.

As indicated, the coating composition also comprises a crosslinker that is reactive with the carboxylic acid functional groups of the polyester polymer. As used herein, a "crosslinker" refers to a molecule comprising two or more functional groups that are reactive with other functional groups and which is capable of linking two or more monomers or polymer molecules through chemical bonds. It will be appreciated that the polyester polymer of the present invention can cure through the reaction between the carboxylic acid functional groups of the polyester polymer, and the functional groups of the crosslinkers.

Non-limiting examples of crosslinkers include phenolic compounds, epoxy compounds, (meth)acrylic compounds, hydroxyalkyl amide compounds, alkylated carbamate resins, polyacids, anhydrides, organometallic acid-functional materials, polyamines, polyamides, aminoplasts, and mixtures thereof. As such, the crosslinkers can comprise, but are not limited to, compounds comprising epoxide groups, acids groups, anhydride groups, hydroxyl groups, amino groups such as primary and secondary amino groups, amide groups, aminoplast based compounds, and combinations thereof.

Non-limiting examples of (meth)acrylic crosslinkers include epoxy functional (meth)acrylic compounds, such as glycidyl functional (meth)acrylic compounds, or other (meth)acrylic compounds having a functional group reactive with the carboxylic acid of the polyester polymer. As used herein, the term "(meth)acrylic" refers to both methacrylic and acrylic. An example of a suitable epoxy functional (meth)acrylic compound is ISOCRYL EP-575® which is commercially available from Estron Chemical.

Non-limiting examples of hydroxylalkyl amide crosslinkers include beta-hydroxyalkylamide compounds such as beta-hydroxyethylamide compounds. An example of a suitable hydroxylalkylamide compound is LUNAMER 552® which is commercially available from DKSH.

The powder coating composition of the present invention may include only one crosslinker, two crosslinkers, or more than two crosslinkers. For example the powder coating composition according to the present invention may comprise a hydroxylalkyl amide compound, an epoxy functional compound, such as an epoxy functional (meth)acrylic compound, or a combination thereof. For example, the powder coating composition may include both a hydroxylalkyl amide compound and a functional (meth)acrylic compound, such as an epoxy functional (meth)acrylic compound, as crosslinkers. The amount of the functional (meth)acrylic compound in the powder coating composition may be greater than the amount of the hydroxylalkyl amide compound, based on the total solids weight of the powder coating composition. The ratio of hydroxylalkyl amide crosslinker to functional (meth)acrylic crosslinker in the powder coating composition may be from 1:14 to 6:1, from 1:10 to 5:1, from 1:7 to 4:1, from 1:14 to 1:1, from 1:10 to 1:1, from 1:7 to 1:1, or from 1:5 to 1:3. The functional (meth)acrylic crosslinker may be used with the powder coating composition both as a crosslinker and as a matting agent to reduce the gloss of the resulting coating.

The crosslinker(s) can comprise at least 1 weight %, at least 2 weight %, or at least 5 weight % of the powder coating composition, based on the total solids weight of the coating composition. The crosslinker(s) can comprise up to 30 weight %, up to 20 weight %, or up to 15 weight %, up to 10 weight %, or up to 7 weight % of the coating composition, based on the total solids weight of the coating composition. The crosslinker(s) can also comprise an amount within a range such as from 1 to 30 weight %, from 1 to 20 weight %, or from 2 to 15 weight %, from 2 to 10 weight %, or from 2 to 7 weight % of the coating composition, based on the total solids weight of the coating composition.

Further, the crosslinker can also be added to the coating composition such that an equivalent ratio of the reactive functional groups on the crosslinker to reactive functional groups on the polyester polymer is from 0.75:1 to 1.5:1, from 0.90:1 to 1.4:1, or from 1.05:1 to 1.25:1. For example, the crosslinker can comprise hydroxyl groups and the polyester polymer can comprise carboxylic acid groups such that a ratio of total hydroxyl equivalents to total carboxylic acid equivalents is from 0.75:1 to 1.5:1, from 0.90:1 to 1.4:1, or from 1.05:1 to 1.25:1.

The powder coating composition of the present invention may be substantially free, essentially free, or completely free of an isocyanate functional crosslinker. The term "substantially free" as used in this context means the powder coating composition contains less than 1000 parts per million (ppm) of an isocyanate functional crosslinker based on the total solids weight of the coating composition, "essentially free" means less than 100 ppm of an isocyanate functional crosslinker based on the total solids weight of the coating composition, and "completely free" means less than 20 parts per billion (ppb) of an isocyanate functional crosslinker based on the total solids weight of the coating composition.

The coating composition of the present invention can also include a matting agent. As used herein, the term "matting agent" refers to a material added to a coating composition to reduce the gloss of a coating formed from the composition. The term "matting agent" is interchangeable with the term "flatting agent". The matting agent can also provide other properties in the final coating. For instance, the matting agent can also improve abrasion, rub, and/or scratch resistance; control viscosity; and/or enhance soft touch properties in the final coating. Non-limiting examples of suitable matting agents include metal hydroxides, metal oxides, silicas, pyrogenic silica, wax-treated silica, micronized wax, polyether condensate, polyamide microbeads, polyurethane microbeads, silicone microbeads, (meth)acrylic compounds, and mixtures thereof.

The crosslinker used with the present invention may also function as a matting agent. For instance, the coating composition may utilize a functional (meth)acrylic compound, such as an epoxy functional (meth)acrylic compound, that also functions as a matting agent. It has been found that functional (meth)acrylic compounds provide better performance as matting agents, including but not limited to weatherability performance, as compared to other matting agents that do not crosslink or react with the carboxylic acid groups of the polyester polymer.

The coating compositions of the present invention can also include other optional materials. For example, the coating compositions can also comprise a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof. The terms "pigment" and "colored filler" can be used interchangeably.

Other examples of pigments include, but are not limited to, those that are solvent and/or aqueous based such as phthalo green or blue, iron oxide, bismuth vanadate, anthraquinone, and perylene and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

It is appreciated that the colorants used with the powder coating composition can be selected for use with certain substrates in certain areas. For example, the colorants can be selected, as determined by one skilled in the art, for use with architectural base substrates. Non-limiting examples of colorants that may be used in the architectural industry include carbon black, C.I. Pigment Black 28, C.I. Pigment Red 101, C.I. Pigment Brown 24, titanium dioxide, mica-based pigments, barium sulfate, or combinations thereof.

The colorant(s) can comprise at least 1 weight %, at least 2 weight %, or at least 3 weight % of the powder coating composition, based on the total solids weight of the coating composition. The colorant(s) can comprise up to 50 weight %, up to 40 weight %, or up to 30 weight % of the coating composition, based on the total solids weight of the coating composition. The colorant(s) can also comprise an amount within a range such as from 1 to 50 weight %, from 2 to 40 weight %, or from 3 to 30 weight % of the coating composition, based on the total solids weight of the coating composition.

The powder coating composition may include various other additives. Non-limiting examples of materials that can be used with the powder coating compositions of the present invention include plasticizers, anti-oxidants, flow and surface control agents such as waxes (e.g., amide waxes), flow and leveling control agents such as acrylic and/or silica agents, thixotropic agents, slip aids, catalysts such as metal catalysts (e.g., tin catalysts), anti-gassing agents such as benzoin, reaction inhibitors, texturizers, and other customary auxiliaries.

The powder coating composition and/or the coating system according to the present invention may also be substantially free, may be essentially free or may be completely free of triglycidyl isocyanurate (TGIC). The term "substantially free" as used in this context means the powder coating composition contains less than 1000 parts per million (ppm) of a component based on the total solids weight of the coating composition, "essentially free" means less than 100 ppm of a component based on the total solids weight of the coating composition, and "completely free" means less than 20 parts per billion (ppb) of a component based on the total solids weight of the coating composition. Further, the powder coating composition may be substantially free, may be essentially free or may be completely free of epsilon-caprolactam. Further still, the powder coating composition may be substantially free, may be essentially free, or may be completely free of an organic ultraviolet absorber. An "ultraviolet absorber", as used herein, refers to a compound that absorbs ultraviolet radiation to reduce the ultraviolet degradation of a material. Non-limiting examples of organic ultraviolet absorbers include a salicylate, a benzotriazole, a benzophenone, or a cyanoacrylate compound. The powder coating composition may be substantially free, may be essentially free, or may be completely free of an inorganic ultraviolet absorber. Non-limiting examples of inorganic ultraviolet absorbers include cerium oxide and zinc oxide. The powder coating composition may be substantially free, may be essentially free, or may be completely free of a hindered amine light stabilizer.

The powder coating composition of the present invention can be prepared by mixing the previously described polyester polymer, thermoplastic fluoropolymer, crosslinker, and optional additional components, if used. The components can be mixed using art-recognized techniques and equipment such as with a Prism high speed mixer for example. When a solid coating composition is formed, the mixture is next melted and further mixed. The mixture can be melted with a twin screw extruder or a similar apparatus known in the art. During the melting process, the temperatures will be chosen to melt mix the solid mixture without curing the mixture. The mixture can be melt mixed in a twin screw extruder with zones set to a temperature of 40° C. to 125° C., such as from 50° C. to 100° C. or at about 75° C. After melt mixing, the mixture is cooled and re-solidified. The re-solidified mixture is then ground such as in a milling process to form a solid particulate curable powder coating composition.

The re-solidified mixture can be ground to any desired particle size. For example, the re-solidified mixture can be ground to an average particle size of at least 10 microns or at least 20 microns and up to 100 microns as determined with a Malvern Mastersizer 3000 Laser Diffraction Particle Size Analyzer following the instructions described in the Malvern Mastersizer 3000 manual. The powder may have an average particle size from 15 to 150 microns, such as from 20-50 microns, from 25-40 microns, from 30-45 microns, from 30-40 microns, or from 35-40 microns. Further, the particle size range of the total amount of particles in a sample used to determine the average particle size can comprise a range of from 1 micron to 200 microns, or from 5 microns to 180 microns, or from 10 microns to 150 microns, which is also determined with a Malvern Mastersizer 3000 Laser Diffraction Particle Size Analyzer following the instructions described in the Malvern Mastersizer 3000 manual.

After forming the coating composition of the present invention, the composition can be applied to a wide range of substrates known in the coatings industry. For example, the coating composition of the present invention can be applied to automotive substrates and components (e.g. automotive vehicles including, but not limited to, cars, buses, trucks, trailers, etc.), industrial substrates, aircraft and aircraft components, marine substrates and components such as ships, vessels, and on-shore and off-shore installations, storage tanks, windmills, nuclear plants, heavy equipment (e.g. heavy machines, heavy trucks, construction equipment, heavy vehicles, heavy hydraulics, etc.), packaging substrates, wood flooring and furniture, apparel, electronics, including housings and circuit boards, glass and transparencies, sports equipment, including golf balls, stadiums, buildings, bridges, and the like. These substrates can be, for example, metallic or non-metallic.

Metallic substrates include, but are not limited to, tin, steel (including electrogalvanized steel, cold rolled steel, hot-dipped galvanized steel, steel alloys, or blasted/profiled steel, among others), aluminum, aluminum alloys, zinc-aluminum alloys, steel coated with a zinc-aluminum alloy, and aluminum plated steel. As used herein, blasted or profiled steel refers to steel that has been subjected to abrasive blasting and which involves mechanical cleaning by continuously impacting the steel substrate with abrasive particles at high velocities using compressed air or by centrifugal impellers. The abrasives are typically recycled/reused materials and the process can efficiently remove mill scale and rust. The standard grades of cleanliness for abrasive blast cleaning is conducted in accordance with BS EN ISO 8501-1.

Further, non-metallic substrates include polymeric and plastic substrates including polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethylene terephthalate) (PET), polycarbonate, polycarbonate acrylobutadiene styrene (PC/ABS), polyamide, wood, veneer, wood composite, particle board, medium density fiberboard, cement, stone, glass, paper, cardboard, textiles, leather, both synthetic and natural, and the like. It is appreciated that the coating compositions can be applied to various areas of any of the previously described substrates to form a continuous solid coating such as over the body and edges of a substrate and which provides the superior properties described herein.

The coatings of the present invention are particularly useful when applied in architectural applications. For example, the coatings of the present invention can be applied to substrates such as windows, roofing, siding, door frames, railings, and the like.

The coating compositions of the present invention can be applied by any means standard in the art, such as spraying, electrostatic spraying, and the like. After the coating compositions are applied to a substrate, the compositions can be cured at ambient conditions, with heat, or with other means such as actinic radiation to form a coating, such as a single coating layer.

The coatings formed from the coating compositions of the present invention can be applied to a dry film thickness of less than 8 mils, less than 6 mils, less 5 mils, less than 4 mils, or less than 3 mils, such as 2.5 mils.

The coating composition can be applied to a substrate to form a monocoat. As used herein, a "monocoat" refers to a single layer coating system that is free of additional coating layers. Thus, the coating composition can be applied directly to a substrate without any intermediate coating layer and cured to form a single layer coating, i.e. a monocoat.

Alternatively, the coating composition can be applied to a substrate as a first coating layer along with additional coating layers, such as a second coating layer, to form a multi-layer coating system. It is appreciated that the multi-layer coating can comprise multiple coating layers such as three or more, or four or more, or five or more, coating layers. For example, the previously described coating composition of the present invention can be applied to a substrate as a primer layer and second and third coating layers, and, optionally, additional coatings layers, can be applied over the primer layer as basecoats and/or topcoats. As used herein, a "primer" refers to a coating composition from which an undercoating may be deposited onto a substrate in order to prepare the surface for application of a protective or decorative coating system. A "basecoat" refers to a coating composition from which a coating is deposited onto a primer and/or directly onto a substrate, optionally, including components (such as pigments) that impact the color and/or provide other visual impact, and which may be overcoated with a protective and decorative topcoat. Alternatively, the coating composition of the present invention may be applied as a basecoat and/or a topcoat over a primer layer. The coating composition of the present invention may be applied over another coating system, which may enhance the weatherability of the coating system.

The powder coating compositions of the present invention can be applied to a substrate and cured to have coatings which have a broad gloss range available. For example, coatings formed from the powder coating compositions described herein can exhibit a low 60 Degree Gloss, such as less than 40, less than 30, less than 20, or less than 10, as measured by ASTM D523-14 test method using a BYK Gardner micro-TRI-gloss meter. However, coatings formed from the powder coating compositions described herein may also exhibit a high 60 Degree Gloss, such as at least 70, or at least 80. The coating compositions of the present invention are formulated to maintain good durability with and without the presence of matting agents to allow for a broad variety of gloss in the cured coatings.

The powder coating compositions of the present invention can be applied to a substrate to provide durable coatings as exhibited by good adhesion, impact resistance, corrosion resistance, and humidity resistance. For example, coatings formed from the powder coating compositions described herein have been found to exhibit one or more than one, or all of the following: less than 5% area removed in Dry Adhesion tests, such as 0% area removed, as measured by ASTM D3359-09 test method B; less than 15% area removed in Boiling Adhesion tests, such as less than 10% area removed, such as 0% area removed, as measured by ASTM AAMA 2605-17A Section 8.4.1.2 and ASTM D3359-09 test method B; a Pass in Forward Impact Resistance test, as measured by AAMA 2605-17A Section 8.5; less than 10% area removed in Reverse Impact Tests, such as less than 5% area removed, as measured by AAMA 2605-17A Section 8.5 when the impact is applied to the opposite side of the coating and 0.025×3×6 inch aluminum panels with no pretreatment are used; less than 1 mm average scribe creepage in Cyclic Corrosion Resistance tests, such as less than 0.5 mm, as measured by AAMA 2605-17A Section 8.8.2 and ASTM G85, Annex A5 and ASTM D 1654; less than 1 mm average scribe creepage in 250 Hr. Copper Accelerated Acetic-Acid Salt Spray corrosion tests, such as less than 0.5 mm, as measured by ASTM B368 and ASTM D 1654; and the observation of no blisters in Humidity Resistance tests as measured by AAMA 2605-17A Section 8.8.1 and ASTM D4585-13.

Thus, the powder coating compositions described herein can be applied to a substrate to form coatings with good weatherability and corrosion resistance, and other properties desired in a coating. Moreover, the coating compositions utilize polyester polymers to form the crosslinked coating, thereby lowering the amount of fluoropolymer required in the coating composition and reducing the cost of the required raw materials.

The following examples are presented to demonstrate the general principles of the invention. The invention should not be considered as limited to the specific examples presented. All parts and percentages in the examples are by weight unless otherwise indicated.

EXAMPLES 1-5 AND COMPARATIVE EXAMPLE 1

Preparation of Curable Coating Compositions

Six (6) curable coating compositions were prepared from the components listed in Table 1.

TABLE 1

| Component | Ex. C1 (grams) | Ex. 1 (grams) | Ex. 2 (grams) | Ex. 3 (grams) | Ex. 4 (grams) | Ex. 5 (grams) |
|---|---|---|---|---|---|---|
| Reafree 5700 [1] | 343 | 382 | 553 | 617 | 427 | 481.1 |
| Lunamer 552 [2] | 7 | 8 | 22 | 33 | 23 | 18.4 |
| Isocryl EP-575 [3] | 50 | 60 | 35 | — | — | 34 |
| Lumiflon 710F [4] | 204 | 200 | 200 | 200 | 200 | 194 |
| Vestagon B-1530 [5] | 46 | — | — | — | — | — |
| Resiflow PL-200A [6] | 9 | 9 | 9 | 9 | 9 | 8.7 |
| Powdermate 542DG [7] | 5 | 5 | 5 | — | 5 | 4.9 |
| Benzoin [8] | — | — | — | 5 | — | — |
| Black 430 [9] | — | — | 96 | 100 | — | 106.7 |
| 1200 EZ [10] | — | — | 10 | — | — | 0.7 |
| Yellow 193 [11] | — | — | 14.5 | — | — | 19.4 |
| Tronox CR-880 [12] | 336 | 336 | 12 | — | 336 | 19.4 |
| Exbar W4 [13] | — | — | 43.5 | 36 | — | 82.7 |
| Mearlin Bright White 139X [14] | — | — | — | — | — | 10 |
| Mearlin Sparkle 139P [15] | — | — | — | — | — | 20 |

[1] A polyester resin based on isophthalic acid having an acid value of about 32 to 38, commercially available from Arkema.
[2] Hydroxyalkylamide crosslinker, commercially available from DKSH.
[3] Matting epoxy-functional acrylic crosslinker, commercially available from Estron Chemical.
[4] Fluoroethylene vinyl ether resin, commercially available from AGC Chemicals.
[5] Isocyanate Crosslinker blocked with ε-Caprolactam, commercially available from Evonik.
[6] Acrylic/silica flow and leveling control agent, commercially available from Estron Chemical.
[7] Degassing/debubbling agent, commercially available from Troy Corporation.
[8] Degassing/debubbling agent, commercially available from Mitsubishi Chemical Corp.
[9] C.I. Pigment Black 28, commercially available from The Shepherd Color Company.
[10] C.I. Pigment Red 101, commercially available from Dequing Tongcheng Co., Ltd.
[11] C.I. Pigment Brown 24, commercially available from The Shepherd Color Company.
[12] Titanium dioxide pigment, commercially available from Tronox.
[13] White barium sulfate with a median particle size of 4 microns, commercially available from Excalibur Minerals.
[14] Mica coated with titanium dioxide, stannic oxide, and chromium hydroxide having a mass median diameter particle size in the 18.2 to 21.1 micron range, commercially available from BASF Corporation.
[15] Mica coated with titanium dioxide, stannic oxide, and chromium hydroxide having a mass median diameter particle size in the 32 to 46 micron range, commercially available from BASF Corporation.

For Examples 1-4 and Comparative Example 1 (C1), each of the components listed in Table 1 were weighed in a plastic bag and mixed by shaking vigorously in the bag for 30 seconds to form a dry homogeneous mixture. For Example 5, the first eleven ingredients listed in Table 1 were used to form an intermediate solid particulate powder coating composition. This intermediate solid particulate powder coating composition was weighed in a plastic bag along with the final two ingredients in Table 1 and mixed by shaking vigorously in the bag for 30 seconds to yield a final solid particulate powder coating composition that is free flowing.

Each mixture was melt mixed in a Theysohn 30 mm twin screw extruder with a moderately aggressive screw configuration and a speed of 500 RPM. The first extruder zone was set at 50° C., and the second zone was set to 100° C. The feed rate was such that a torque of 30-35% was observed on the equipment. The mixtures were dropped onto a set of chill rolls to cool and re-solidify the mixtures into solid chips. The chips were milled using a coffee grinder and sieved through a 104 micron screen to obtain a mass median diameter particle size of 35-40 microns. The resulting coating compositions for each of Examples 1-5 and Comparative Example 1 (C1) were solid particulate powder coating compositions that were free flowing.

All powder coating compositions from Examples 1-5 and Comparative Example 1 were applied over several chromate pretreated 0.025 inch by 3 inch by 6 inch aluminum panels at film thicknesses shown in Table 1 and heated for 15 minutes at 400° F. Various properties of the cured coatings, determined by tests performed on these coated panels, are shown in Table 2.

TABLE 2

| Property/test | Example C1 | Example 1 | Example 2 | Example 3 | Example 4 | Example 5 |
|---|---|---|---|---|---|---|
| Coating Thickness (mils) [16] | 2.5 | 2.5 | 2.5 | 2.5 | 2.5 | 2.5 |
| 60 Degree Gloss [17] | 6.4 | 9.9 | 36 | 82 | 85 | 26 |

TABLE 2-continued

| Property/test | Example C1 | Example 1 | Example 2 | Example 3 | Example 4 | Example 5 |
|---|---|---|---|---|---|---|
| Dry Adhesion (% of area removed) [18] | 0% | 0% | 0% | 0% | 0% | 0% |
| Boiling Water Adhesion (% of area removed) [19] | >65% | 5-15% | 0% | 0% | 0% | 0% |
| Forward Impact Resistance (Adhesion Loss from Tape Pull - Pass/Fail) [20] | Pass | Pass | — | Pass | Pass | — |
| Reverse Impact (% of area removed) [21] | >50% | <5% | — | — | — | — |
| Cyclic Corrosion Resistance - Average Scribe Creepage (mm) [22] | — | — | — | 0-0.5 mm | 0-0.5 mm | — |
| Humidity Resistance [23] | — | — | — | No Blisters | No Blisters | — |

[16] Per ASTM D7091-13 test method using Elcometer 415 Model B Dual FNF gauge.
[17] Per ASTM D523-14 test method using BYK Gardner micro-TRI-gloss.
[18] Per ASTM D3359-09 test method B.
[19] Per AAMA 2605-17A Section 8.4.1.2 and ASTM D3359-09 test method B.
[20] Per AAMA 2605-17A Section 8.5.
[21] Per AAMA 2605-17A Section 8.5 with the following exceptions: The impact was applied to the opposite side of the coating. The percentage of the coating removed after the tape pull in the impacted area was estimated. 0.025 inch by 3 inch by 6 inch aluminum panels with no pretreatment were used to complete this test instead of the chromate pretreated panels.
[22] Per AAMA 2605-17A Section 8.8.2 and ASTM G85, Annex A5 for conducting the cyclic corrosion test and ASTM D 1654 for measuring the average scribe creepage.
[23] Per AAMA 2605-17A Section 8.8.1 and ASTM D4585-13.

As shown in Table 2, the coatings prepared from the coating compositions of Examples 1-5 of the present invention exhibit a broad gloss range, good adhesion, impact resistance, corrosion resistance, and humidity resistance. In contrast to Examples 1-5 of the present invention, Comparative Example 1, which utilizes an isocyanate crosslinker reactive with both the acid-functional polyester polymer and the fluoropolymer, exhibits a poor boiling water adhesion as measured by percentage area of the coating removed. Comparative Example 1 also shows poor reverse impact resistance in contrast with Example 1 of the present invention.

Examples 6-9

Preparation of Curable Coating Compositions

Four (4) curable coating compositions were prepared from the components listed in Table 3.

TABLE 3

| Component | Ex. 6 (grams) | Ex. 7 (grams) | Ex. 8 (grams) | Ex. 9 (grams) |
|---|---|---|---|---|
| Kynar PG-11 PVDF [24] | 100.0 | 200.0 | 150.0 | 150.0 |
| Lunamer 552 [2] | 11.6 | 8.2 | 26.0 | 16.2 |
| Uralac P883 [25] | 363.5 | 266.8 | 35 | — |
| Uralac P5525 [26] | — | — | 299 | — |
| Uralac P886 [27] | — | — | — | 308.8 |
| Powdermate 575 [28] | 15.0 | 15.0 | 15.0 | 15.0 |
| Benzoin [8] | 2.4 | 2.4 | 2.5 | 2.5 |
| Monarch 1300 Black [29] | 7.5 | 7.5 | 7.5 | 7.5 |

[24] A Polyvinylidene fluoride (PVDF)/Kynar 500 grade fluoropolymer commercially available from Arkema.
[25] A polyester resin based on isophthalic acid having an acid value of about 18 to 22, commercially available from DSM Resins.
[26] A polyester resin based on isophthalic acid having an acid value of about 49 to 54, commercially available from DSM Resins.
[27] A polyester resin based on isophthalic acid having an acid value of about 33 to 37, commercially available from DSM Resins.
[28] Acrylic flow and leveling control agent, commercially available from Troy Corporation.
[29] Monarch 1300 Carbon Black, commercially available from Cabot Corporation.

Each of the components listed in Table 3 for Examples 6-9 were weighed in a plastic bag and mixed by shaking vigorously in the bag for 30 seconds to form a dry homogeneous mixture.

The mixture was melt mixed in a Werner & Pfleiderer 30 mm twin screw extruder with a moderately aggressive screw configuration and a speed of 450 RPM. The first extruder zone was set at 75° C., and the second zone was set to 75° C. The feed rate was such that a torque of 30-35% was observed on the equipment. The mixtures were dropped onto a set of chill rolls to cool and re-solidify the mixtures into solid chips. The chips were milled using a coffee grinder and sieved through a 104 micron screen to obtain a mass median diameter particle size of 35-40 microns. The resulting coating compositions for each of Examples 6-9 were solid particulate powder coating compositions that were free flowing.

Each powder coating composition from Examples 6-9 were applied over several chromate pretreated 0.025 inch by 3 inch by 6 inch aluminum panels at film thicknesses shown in Table 1 and heated for 15 minutes at 425° F. Various properties of the cured coatings, determined by tests performed on these coated panels, are shown in Table 4.

TABLE 4

| | test | | | |
|---|---|---|---|---|
| Property | Example 6 | Example 7 | Example 8 | Example 9 |
| Coating Thickness (mils) [16] | 2.5 | 2.5 | 2.5 | 2.5 |
| 60 Degree Gloss [17] | 38.5 | 22.5 | 30.2 | 31.4 |
| Dry Adhesion (% of area removed) [18] | 0% | 0% | 0% | 0% |
| Boiling Water Adhesion (% of area removed) [19] | 0% | 0% | 0% | 0% |
| Forward Impact Resistance (Adhesion Loss from Tape Pull - Pass/Fail) [20] | Pass | Pass | Pass | Pass |
| Reverse Impact (% of area removed) [21] | <5% | <5% | <5% | <5% |
| 250 Hr. CASS Corrosion Resistance - Average Scribe Creepage (mm) [30] | 0-0.5 mm | 0-0.5 mm | 0-0.5 mm | 0-0.5 mm |

TABLE 4-continued

| Property | test | | | |
|---|---|---|---|---|
| | Example 6 | Example 7 | Example 8 | Example 9 |
| Humidity Resistance [23] | No Blisters | No Blisters | No Blisters | No Blisters |

[30] Per ASTM B368 for conducting Copper Accelerated-Acetic Acid Salt Spray corrosion test and ASTM D 1654 for measuring the average scribe creepage.

As shown in Table 4, the coatings formed from the compositions of Examples 6-9 all exhibited good adhesion, impact resistance, corrosion resistance, and humidity resistance.

In view of the foregoing the present invention is directed inter alia, without being limited thereto, to the following clauses.

Clause 1: A powder coating composition comprising a polyester polymer comprising carboxylic acid functional groups and having an acid value of at least 15 mg/KOH; a crosslinker reactive with the carboxylic acid functional groups of the polyester polymer; and a thermoplastic fluoropolymer unreactive with the polyester polymer and crosslinker, wherein the powder coating composition is substantially free of an isocyanate functional crosslinker.

Clause 2: The powder coating composition of clause 1, wherein the polyester polymer comprises at least 20 weight %, at least 30 weight %, at least 35 weight %, at least 40 weight %, at least 50 weight %, or at least 60 weight %, based on the total solids weight of the powder coating composition.

Clause 3: The powder coating composition of clauses 1 or 2, wherein the fluoropolymer comprises 40 weight % or less, 30 weight % or less, or 25 weight % or less, based on the total solids weight of the powder coating composition Clause 4: The powder coating composition of any of clauses 1 to 3, comprising the crosslinker in an amount of from 1 to 30 weight %, from 1 to 20 weight %, or from 2 to 15 weight %, based on the total solids weight of the powder coating composition.

Clause 5: The powder coating composition of any of clauses 1 to 4, wherein the polyester polymer has an acid value within a range of at least 20 and up to 70 mg KOH/g, such as of at least 20 and up to 50 mg KOH/g.

Clause 6: The powder coating composition of any of clauses 1 to 5, wherein the polyester polymer has a glass transition temperature within a range of from 10 to 100° C., from 25 to 85° C., or from 45 to 70° C.

Clause 7: The powder coating composition of any of clauses 1 to 6, wherein the polyester polymer has an melt viscosity at 165° C. within a range of from 5 to 100 Pa·s, from 7 to 85 Pa·s, or from 9 to 70 Pa·s.

Clause 8: The powder coating composition of any of clauses 1 to 7, wherein the thermoplastic fluoropolymer comprises a fluoropolyether polymer, a polyvinylidene fluoride polymer, or a combination thereof.

Clause 9: The powder coating composition of clause 8, wherein the thermoplastic fluoropolymer comprises a fluoropolyether polymer such as a fluoroethylene vinyl ether copolymer.

Clause 10: The powder coating composition of clause 8, wherein the thermoplastic fluoropolymer comprises a polyvinylidene fluoride polymer.

Clause 11: The powder coating composition of any of clauses 1 to 10, wherein the thermoplastic fluoropolymer has a glass transition temperature within a range of from 10 to 100° C., from 25 to 85° C., or from 34 to 70° C.

Clause 12: The powder coating composition of any of clauses 1 to 11, wherein an amount of the polyester polymer in the powder coating composition is greater than an amount of the thermoplastic fluoropolymer, the amounts based on the total solids weight of the powder coating composition.

Clause 13: The powder coating composition of clause 12, wherein a weight ratio of the polyester polymer to the thermoplastic fluoropolymer is from 80:20 to 60:40, from 80:20 to 55:45, or from 76:24 to 65:35.

Clause 14: The powder coating composition of any of clauses 1 to 13, wherein the crosslinker comprises a hydroxylalkyl amide compound, an epoxy functional compound or a combination thereof.

Clause 15: The powder coating composition of clause 14, wherein the crosslinker comprises a hydroxylalkyl amide compound and an epoxy functional acrylic compound.

Clause 16: The powder coating composition of clause 15, wherein an amount of the epoxy functional acrylic compound in the powder coating composition is greater than an amount of the hydroxylalkyl amide compound, the amounts based on the total solids weight of the powder coating composition.

Clause 17: The powder coating composition of clause 15, wherein a weight ratio of the hydroxylalkyl amide compound to the epoxy functional acrylic compound is from 1:14 to 6:1, from 1:10 to 5:1, from 1:7 to 4:1, from 1:14 to 1:1, from 1:10 to 1:1, from 1:7 to 1:1, or from 5:1 to 3:1.

Clause 18: The powder coating composition of any of clauses 1 to 17, wherein the powder coating composition further comprises a pigment.

Clause 19: The powder coating composition of any of clauses 1 to 18, wherein the powder coating composition is substantially free, essentially free, or completely free of epsilon-caprolactam and/or tricglycidyl isocyanurate.

Clause 20: The powder coating composition of any of clauses 1 to 19, wherein the powder coating composition is substantially free, essentially free, or completely free of an organic ultraviolet absorber.

Clause 21: The powder coating composition of any of clauses 1 to 20, wherein the polyester polymer is derived from a reaction of an aliphatic polyol with a polycarboxylic acid or anhydride.

Clause 22: The powder coating composition of clause 21, wherein the polycarboxylic acid is a cyclic polycarboxylic acid.

Clause 23: The powder coating composition of any of clauses 21 or 22, wherein the polycarboyxlic acid is an aromatic polycarboxylic acid.

Clause 24: The powder coating composition of any of clauses 21 to 23, wherein the polycarboxylic acid is a diacid.

Clause 25: The powder coating composition of any of clauses 21 to 24, wherein the polycarboxylic acid is isophthalic acid.

Clause 26: The powder coating composition of any of clauses 21 to 25, wherein the aliphatic polyol comprises from 2 to 12 carbon atoms, for example being selected from 1,2-ethanediol, 1,3-propanediol, 1,4-butanediol, 1,6-hexanediol, neopentyl glycol, cyclohexane dimethanol, trimethylol propane or a combination of any of the foregoing.

Clause 27: The powder coating composition of any one of clauses 1 to 26, wherein the powder coating composition comprises a matting agent.

Clause 28: The powder coating composition of any one of clauses 1 to 27, wherein when cured, the powder coating composition forms a single coating layer comprising the polyester polymer and the fluoropolymer.

Clause 29: A substrate at least partially coated with a coating formed from the powder coating composition of any of clauses 1 to 28.

Clause 30: The substrate of clause 29, wherein the coating formed from the powder coating composition according to any one of clauses 1 to 28 comprises a single coating layer, which may for example be formed directly over the surface of the substrate.

Clause 31: A method for coating a substrate comprising applying the coating composition of any of clauses 1 to 28 to a substrate and curing the coating composition.

Whereas particular embodiments of this invention have been described above for purposes of illustration, it will be evident to those skilled in the art that numerous variations of the details of the present invention may be made without departing from the invention as defined in the appended claims.

The invention claimed is:

1. A powder coating composition comprising:
   a polyester polymer comprising carboxylic acid functional groups and having an acid value of at least 15 mg KOH/g;
   a crosslinker reactive with the carboxylic acid functional groups of the polyester polymer; and
   a thermoplastic fluoropolymer unreactive with the polyester polymer and crosslinker,
   wherein the powder coating composition is substantially free of an isocyanate functional crosslinker.

2. The powder coating composition of claim 1, wherein the polyester polymer comprises at least 20 weight % based on the total solids weight of the powder coating composition.

3. The powder coating composition of claim 1, wherein the fluoropolymer comprises 40 weight % or less based on the total solids weight of the powder coating composition.

4. The powder coating composition of claim 1, wherein the polyester polymer has an acid value within a range of at least 20 and up to 70 mg KOH/g.

5. The powder coating composition of claim 1, wherein the polyester polymer has a glass transition temperature within a range of from 10 to 100° C.

6. The powder coating composition of claim 1, wherein the polyester polymer has a melt viscosity at 165° C. within a range of from 5 to 100 Pa·s as measured by a Cone and Plate Viscometer according to ASTM D 4287.

7. The powder coating composition of claim 1, wherein the thermoplastic fluoropolymer comprises a fluoropolyether polymer, a polyvinylidene fluoride polymer, or a combination thereof.

8. The powder coating composition of claim 7, wherein the thermoplastic fluoropolymer comprises a fluoropolyether polymer.

9. The powder coating composition of claim 8, wherein the fluoropolyether polymer is a fluoroethylene vinyl ether copolymer.

10. The powder coating composition of claim 7, wherein the thermoplastic fluoropolymer comprises a polyvinylidene fluoride polymer.

11. The powder coating composition of claim 1, wherein the thermoplastic fluoropolymer has a glass transition temperature within a range of from 10 to 100° C.

12. The powder coating composition of claim 1, wherein a weight ratio of the polyester polymer to the thermoplastic fluoropolymer is from 80:20 to 60:40.

13. The powder coating composition of claim 1, wherein the crosslinker comprises a hydroxylalkyl amide compound, an epoxy-functional compound, or a combination thereof.

14. The powder coating composition of claim 13, wherein the crosslinker comprises both a hydroxylalkyl amide compound and an epoxy functional (meth)acrylic compound.

15. The powder coating composition of claim 14, wherein an amount of the epoxy functional (meth)acrylic compound in the powder coating composition is greater than an amount of the hydroxylalkyl amide compound, the amounts based on the total solids weight of the powder coating composition.

16. The powder coating composition of claim 1, wherein the powder coating composition further comprises a pigment.

17. The powder coating composition of claim 1, wherein the powder coating composition is substantially free of epsilon-caprolactam and/or triglycidyl isocyanurate.

18. The powder coating composition of claim 1, wherein the powder coating composition is substantially free of an organic ultraviolet absorber.

19. The powder coating composition of claim 1, wherein when cured, the powder coating composition forms a single coating layer comprising the polyester polymer and the fluoropolymer.

20. A substrate at least partially coated with a coating formed from the powder coating composition of claim 1.

21. The substrate of claim 20, wherein the coating formed from the powder coating composition of claim 1 comprises a single coating layer formed directly over a surface of the substrate.

* * * * *